April 4, 1939.   F. LUX   2,153,148
FASTENING MEANS
Filed Sept. 11, 1937
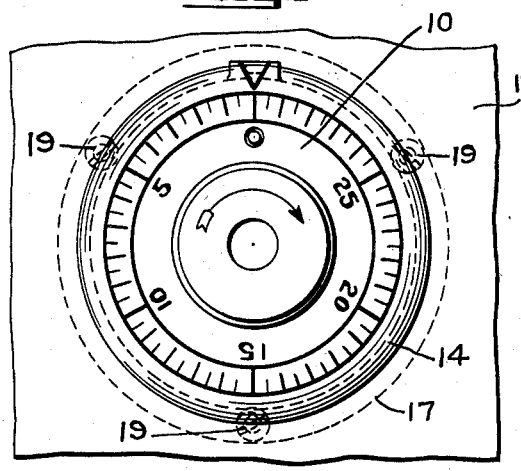
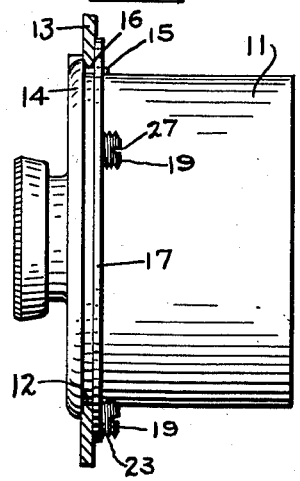
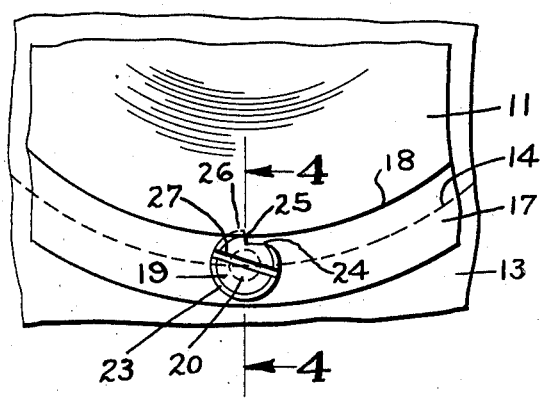
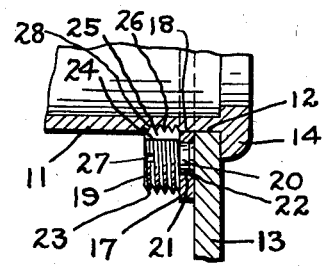
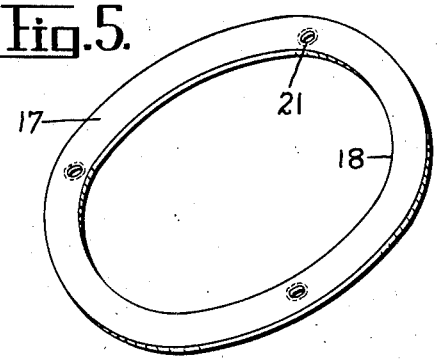
INVENTOR
*Frederick Lux.*
BY
*H. G. Manning*
ATTORNEY Patented Apr. 4, 1939

2,153,148

UNITED STATES PATENT OFFICE 2,153,148

FASTENING MEANS

Frederick Lux, Waterbury, Conn., assignor to The Lux Clock Manufacturing Company, Waterbury, Conn., a corporation of Connecticut Application September 11, 1937, Serial No. 163,443

9 Claims. (Cl. 248—27)

This invention relates to fastening means, and more particularly to means for fastening a flanged casing to a panel.

The fastening means of this invention is especially useful in mounting instruments, such as meters, speedometers, clocks, etc., to automobile dash panels or to other supporting panels or the like. This novel fastening means obviates the use of separate clamps, screws, or bolts, threaded into or passing through the panel—thus reducing the number of parts and the labor required to so mount such instruments. The fastening means of this invention is especially adapted to fasten a flanged instrument casing to panels of various thicknesses, and to rigidly secure such instruments to these panels in proper operative position.

One object of this invention is to provide an improved means of the above nature which is operable to draw the flange of the instrument tightly against the panel, and at the same time to rigidly secure the instrument thereto.

A further object is to provide means for fastening a flanged instrument to a panel which includes a member operable to draw the flange of the instrument tightly against one face of the panel, which becomes secured itself to the instrument, and which during assembly is adapted to force an associated member tightly against the other face of the panel to clamp the panel against the flange.

A still further object is to provide a fastening means of the above nature which will be simple in construction, inexpensive to manufacture, readily manipulated, compact, ornamental in appearance, and very efficient and durable in use.

With these and other objects in view, there has been illustrated on the accompanying drawing one form in which the invention may be conveniently embodied in practice.

In the drawing:

Fig. 1 is a front face view of an instrument secured to a panel by the means of the invention.

Fig. 2 is a side view of the same with the panel shown in section.

Fig. 3 is an enlarged broken rear view of a portion of the parts shown in Fig. 2.

Fig. 4 is a section taken on the line 4—4 of Fig. 3.

Fig. 5 is a perspective view of the ring member.

Referring now to the drawing wherein like reference numerals indicate like parts throughout the several views, the numeral 10 indicates an instrument, the casing body 11 of which is adapted to extend through an opening 12 in a supporting panel 13. Herein the casing body 11 is shown as being cylindrical, but it will be understood that the invention is not limited for use only with cylindrical casings, but may be equally advantageously used with other shapes of casings. The casing body 11 is adapted to pass through the opening 12 in the panel 13 and is provided with a flange 14 extending outwardly from and about the peripheral edge at one of its ends. The flange 14 is adapted to abut against one surface, herein the front surface, of the panel 13. If desired, the casing body 11 may be provided with a key lug 15 adapted to enter a slot 16 formed in the panel 13 to always locate the instrument in the same position thereon.

In order to fasten the casing body 11 to the panel 13, provision is made of a member 17, herein shown shaped as a ring, which encircles or surrounds the casing body 11. The ring 17 has an opening 18 slightly larger in diameter than the diameter of the casing body 11, permitting the member 17 to be easily slid thereover and into engagement with the other surface, herein the rear surface of the panel 13. A plurality of screw members 19, equally spaced apart about the member 17, three in this instance, are adapted to engage the body 11 and to force the member 17 into close contact with the rear surface of the panel 13, thereby drawing the flange 14 into close contact with the front surface of the panel 13 and clamping and rigidly connecting the instrument to the panel.

Each of the screw members 19 is provided with a short reduced stem 20 which is rotatably disposed in a perforation 21 in the ring 17, the end of each stem 20 being riveted over, as at 22, behind the ring 17. The body portion of each of the screw members 19 is provided with screw threads 23 formed upon its periphery, and a cutaway section 24 at one side, which forms a substantially radial face 25, having a plurality of V-shaped cutting edges 26 where it cuts across the threads 23. A kerf slot 27 is provided in the outer end face of each of the screw members 19 to receive a tool, such as a screw driver, by which the screw members 17 may be rotated. Rotation of the screw members 19 in a direction to imbed or force the cutting edges 26 into the material forming the casing body 11 will obviously form short screw threads or notches 28 therein.

Continued rotation of the screw members 19 after the notches 28 are formed will cause the ring member 17 to be moved along the body 11 toward and into engagement with the panel 13. To insure that the cutting edges 26 engage the body 11 and cut the notches 28 deep enough to be effective, the axis of each perforation 21 in the ring member 17 in which the stems 20 of the screw members 19 are disposed, is spaced from the periphery of the opening 18 in the member 17 a distance less than one-half the diameter of the members 19. The amount by which the cut-away section 24 is spaced inwardly from the periphery of the members 19 permits it to clear the periphery of the casing body 11 and not interfere with the easy sliding movement of the ring member 17 upon and over the casing body 11. In instances where the casing body 11 is made of moldable fibrous or like material, or of soft metal, such as die casting metal, the screw members 19 will readily form notches 28 therein, but when the body 11 is of harder metal, it may be desirable to case-harden or temper the members 19 to insure that the notches 28 will be formed.

Operation

In operation, when it is desired to mount an instrument upon a panel 13, an opening 12 will first be provided in said panel of sufficient size to allow the body 11 to be inserted therethrough until the flange 14 abuts the front face of the panel 13. The ring 17 is then slid over the body 11, and manually held firmly against the rear face of the panel 13. The screw members 19 will then be rotated, as by a screw driver, until the instrument is firmly secured in place as above pointed out. By the use of the novel fastening means above disclosed, the instrument may be readily removed from one panel, and as readily and efficiently mounted on another panel having either a thicker or thinner wall than the first one.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a fastening means of the type described, an annular first member having an opening to receive the body portion of an instrument casing, and a screw-threaded second member rotatably mounted in said first member having a portion of its perimeter adapted to extend inwardly beyond the inner rim of said first member and having another portion of its perimeter cut away to form a longitudinal notch to permit said second member to lie out of contact with said casing in one position and being adapted to have its threads engage and be imbedded in the material of said casing to secure said first member thereto and to move said first member longitudinally along the body portion of said casing when said second member is twisted to a second position.

2. Means to fasten a cylindrical member having a flange at one end to a panel having an opening to receive said cylindrical member with the flange thereof abutting one surface of said panel, comprising a ring slidable longitudinally on said cylindrical member, and threaded means rotatably mounted on said ring and arranged to have its threads imbedded in the material of said cylindrical member when it is rotated to force said ring against the surface of said panel opposite that engaged by said flange.

3. Means to fasten a cylindrical member having a flange at one end to a panel having an opening to receive said cylindrical member with the flange thereof abutting one surface of said panel, comprising a ring slidable longitudinally on said cylindrical member, and a screw threaded member having a cut-away section crossing the threads thereof to form V-shaped teeth, said threaded member being rotatably mounted upon said ring and adapted when turned to have the V-shaped teeth become imbedded in the material of said cylindrical member to secure said ring thereto and to force said ring into clamping engagement with the surface of said panel opposite that engaged by said flange, whereby said flange will be drawn against said panel.

4. In a fastening means of the type described, an annular member adapted to slide over the body portion of an instrument casing, and rotatable track cutting means carried by said member and having a portion initially out of contact with but adapted to engage said body portion when said means is rotated to connect said member to said casing body and to cause said member to move along said casing body.

5. In a fastening means of the type described, a member adapted to slide over the body portion of an instrument casing, and rotatable means carried by said member including a threaded portion having a longitudinal groove therein forming teeth which will engage said casing body when said means is rotated and becomes imbedded in said casing body to connect said member to said casing body.

6. In combination with a casing body having a flange, a panel having an opening to receive said casing body, an annular member surrounding the casing body, and rotatable track cutting means carried by said member to connect the member to the casing body and to clamp the panel between said flange and said member upon rotation of said means, said means being disposed initially out of contact with said body portion but adapted when rotated to come into engagement therewith.

7. In combination with a casing body having a flange, a panel having an opening to receive said casing body, an annular member surrounding the casing body, and rotatable means carried by said member having an inclined track cutting portion adapted to engage said body when said means is rotated to connect said member to said casing body and to move said member along said casing body, said means being disposed initially out of contact with said body portion but adapted when rotated to come into engagement therewith.

8. In combination with a casing body having a flange, a panel having an opening to receive said casing body, a member surrounding the casing body, and rotatable means carried by said member including a threaded portion having a longitudinal groove therein to form teeth to engage said casing body when said means is rotated and to become imbedded in said casing body to connect said member to said casing body.

9. In combination with a casing body having a flange, a panel having an opening to receive said casing body, a member surrounding the casing body, and rotatable means carried by said member including a threaded portion having a longitudinal groove therein to form track cutting teeth to engage said casing body when said means is rotated and to cut notches in said casing body, said threads cooperating with said notches upon further rotation of said means to move said member longitudinally along said casing body, said means being disposed initially out of contact with said body portion but adapted when rotated to come into engagement therewith.

FREDERICK LUX.